(12) United States Patent
Mallis

(10) Patent No.: US 6,206,436 B1
(45) Date of Patent: Mar. 27, 2001

(54) DIFFERENTIAL WEDGE THREAD FOR THREADED CONNECTOR

(75) Inventor: David Mallis, The Woodlands, TX (US)

(73) Assignee: Hydril Company, Houston, TX (US)

( * ) Notice: Subject to any disclaimer, the term of this patent is extended or adjusted under 35 U.S.C. 154(b) by 0 days.

(21) Appl. No.: 09/253,237

(22) Filed: Feb. 19, 1999

(51) Int. Cl.$^7$ .................................................. F16L 25/00
(52) U.S. Cl. ............................................ 285/334; 285/390
(58) Field of Search ................................. 285/333, 334, 285/390, 355

(56) References Cited

U.S. PATENT DOCUMENTS

| | | | |
|---|---|---|---|
| 4,161,332 | * | 7/1979 | Blose ................................. 285/334 |
| 4,244,607 | * | 1/1981 | Blose ............................. 285/334 X |
| 5,415,442 | * | 5/1995 | Klementich ...................... 285/334 X |
| 6,050,610 | * | 4/2000 | Enderle et al. .................. 285/344 X |

* cited by examiner

Primary Examiner—Suzanne Dino Barrett

(74) Attorney, Agent, or Firm—Rosenthal & Osha L.L.P.

(57) ABSTRACT

In a threaded connector, a box member has at least two tapered, internal, generally dovetail-shaped threads. The internal threads each having stab flanks, load flanks, roots, crests and a wedge ratio and increasing in width in one direction. A pin member has at least two tapered, external, generally dovetail-shaped threads. The external thread has stab flanks, load flanks, roots, crests and a wedge ratio and increases in width in the other direction so that complementary roots and crests of the internal and external threads move into engagement during make-up of the connection in conjunction with the moving of complementary stab and load flanks into engagement upon make-up of the connection. The wedge ratio of one thread is an aggressive wedge ratio with a larger magnitude and the wedge ratio of the another thread is a conservative wedge ratio with a smaller magnitude. Alternatively, a box member has a tapered, internal, generally dovetail-shaped thread incorporated in a two-step configuration and a pin member has a tapered, external, generally dovetail-shaped thread incorporated in two-step configuration. The wedge ratio of one step is an aggressive wedge ratio with a larger magnitude and the wedge ratio of the other step is a conservative wedge ratio with a smaller magnitude.

25 Claims, 8 Drawing Sheets

DIFFERENTIAL WEDGE THREAD FOR THREADED CONNECTOR

FIELD OF THE INVENTION

The present invention involves threaded tubular joints usable in oil and gas well drilling and production, such as tubing, casing, line pipe, and drill pipe, commonly known collectively as oilfield tubular goods. More particularly, the invention relates to a tubular joint for connecting male (pin) and female (box) members.

BACKGROUND OF THE INVENTION

The use of threaded tubular connections for joining flow conduits in an end-to-end relationship to form a continuous flow path for transporting fluid under pressure is well known. Oilfield tubular goods all use threaded connections for connecting adjacent sections of conduit or pipe. Examples of such threaded end connections designed for use on oilfield tubular goods are disclosed in U.S. Pat. Nos. 2,239,942; 2,992,019; 3,359,013; RE 30,647; and RE 34,467, all of which are assigned to the assignee of the present invention.

In U.S. Pat. No. RE 30,647 by Blose, a particular thread form or structure is disclosed for a tubular connection that provides an unusually strong joint while controlling the stress and strain in connected pin and box members within acceptable levels. The pin member is equipped with at least one generally dovetail-shaped external thread whose width increases in one direction along the pin, while the box member is equipped with at least one matching generally dovetail-shaped internal thread whose width increases in the other direction. In this manner, the mating set of helical threads provide a wedge-like engagement of opposing pin and box flanks that limit the extent of relative rotation between the pin and box members, and define a forcible make-up condition that completes the connection. In this thread structure, the flank shoulder angles as well as the thread width can be used to control the stress and strain preload conditions induced in the pin and box members for a given make-up torque. Thus, by tailoring the thread structure to a particular application or use, the tubular connection or joint is limited only by the properties of the materials selected.

Figure 1:
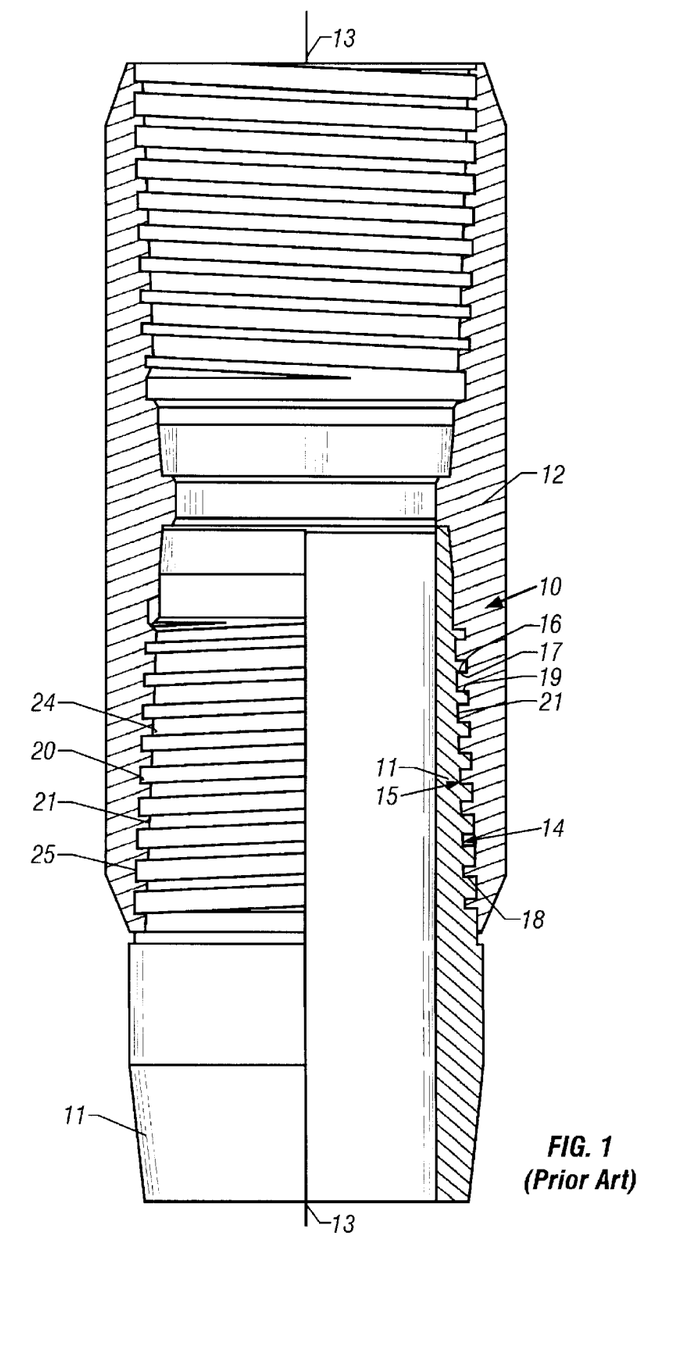
FIG. 1 shows a prior art connector.

As shown in FIG. 1, a prior art connection 10 includes a pin member 11 and a box member 12. Box member 12 has a tapered, internal, generally dovetail-shaped thread structure 14 formed thereon and adapted for engaging complementary tapered, external, generally dovetail-shaped thread structure 15 formed on pin member 11 to mechanically secure the box and pin members in a releasable manner.

Internal thread 14 of box member 12 has stab flanks 18, load flanks 16, roots 20, and crests 24. The thread increases in width progressively at a uniform rate in one direction substantially the entire helical length of thread 14. External thread 15 of pin member 11 has stab flanks 19, load flanks 17, roots 21, and crests 25. The thread increases in width progressively at a uniform rate in the other direction substantially the entire helical length of thread 15. The oppositely increasing thread widths and the taper of threads 14 and 15, cause the complementary roots and crests of the respective threads to move into engagement during make-up of the connection in conjunction with the moving of complementary stab and load flanks into engagement upon make-up of the connection.

The pin member 11 or the box member 12 defines the longitudinal axis 13 of the made-up connection 10. The roots and crests of the box and pin members are flat and parallel to the longitudinal axis of the connection and have sufficient width to prevent any permanent deformation of the threads when the connection is made up.

Figure 2:
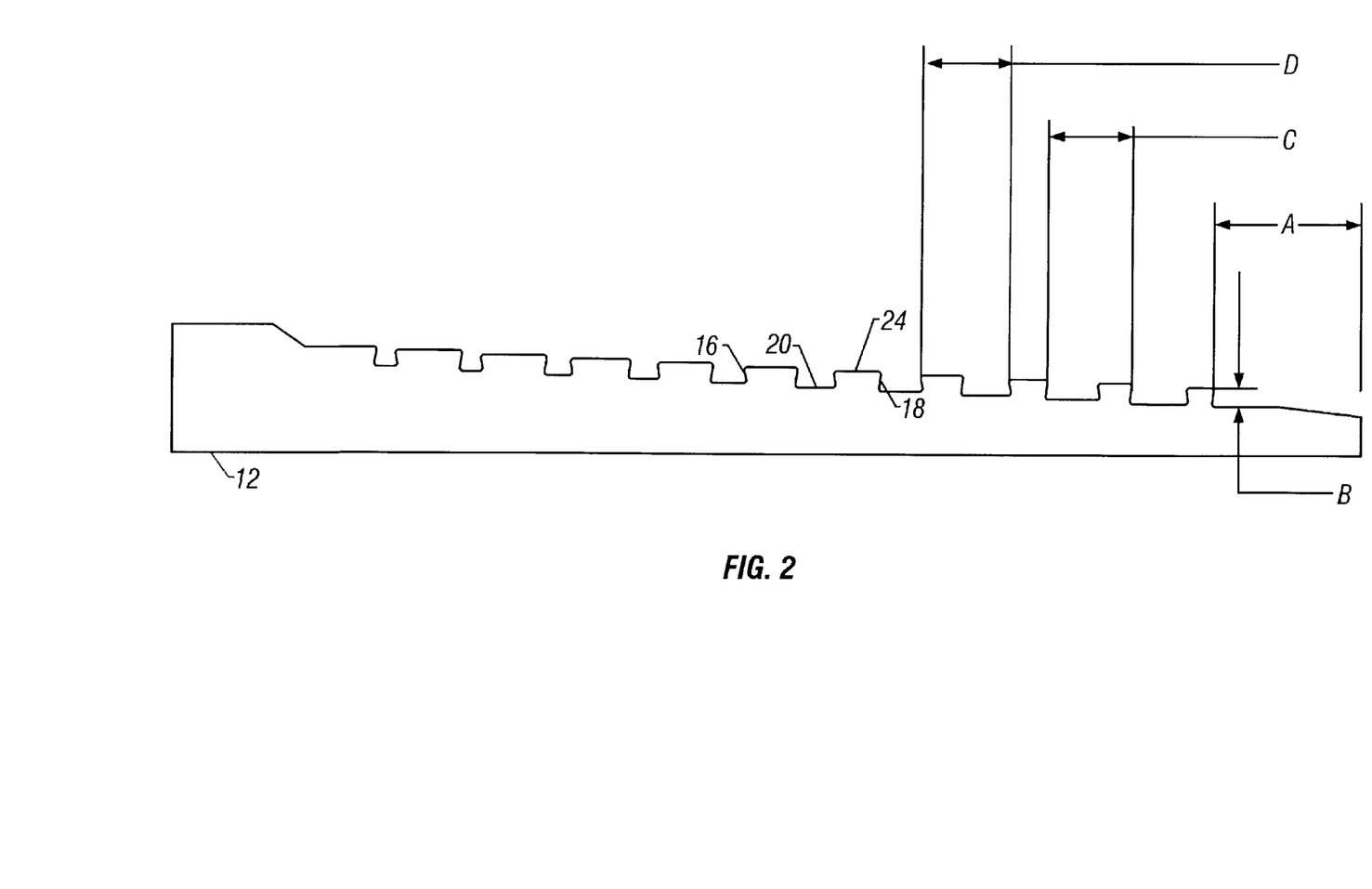
FIG. 2 is a side view of a prior art thread structure.

FIG. 2 shows a profile of the wedge thread on box member 12. The dimension A represents the location of the thread start and dimension B represents the thread depth. The stab flank and load flank leads are denoted C and D respectively.

Figure 3:
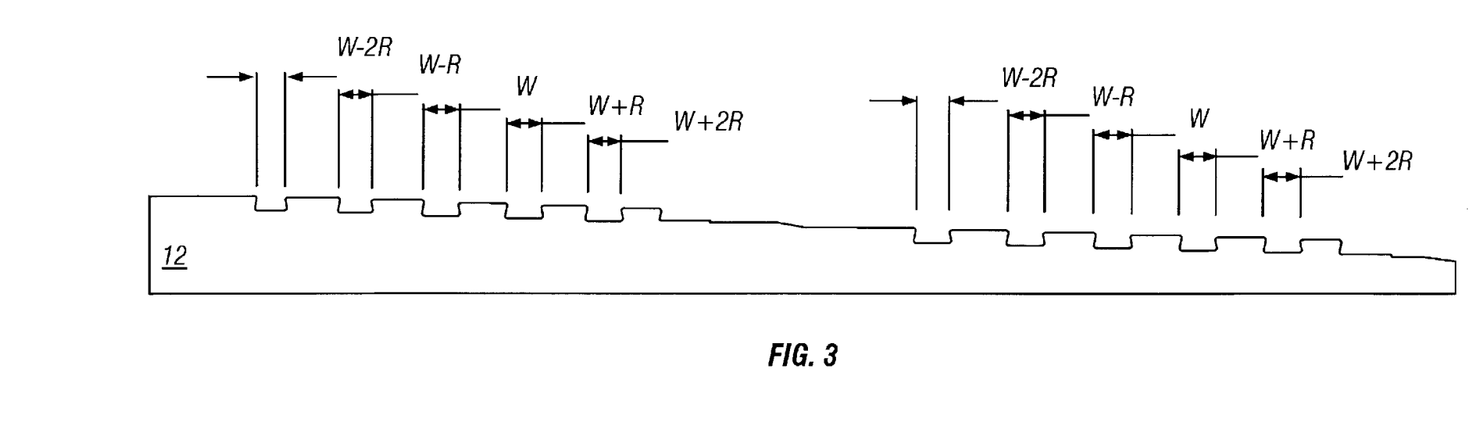
FIG. 3 is a side view of a prior art thread structure.

FIG. 3 shows a profile of the wedge thread on box member 12, for example formed in a two-step configuration. The dimension W represents the basic wedge width and dimension R represents the wedge ratio.

When trying to incorporate a wedge thread with a conical metal-to-metal seal in the prior art, it was necessary to have a very shallow seal angle to compensate for the linear variability of the wedge thread torque stop.

SUMMARY OF THE INVENTION

In general, in one aspect, the invention includes a box member having a tapered, internal, generally dovetail-shaped thread incorporated in a two-step configuration and a pin member having a tapered, external, generally dovetail-shaped thread incorporated in a two-step configuration. The internal thread of the box member has stab flanks, load flanks, roots, crests and a wedge ratio and increases in width in one direction. The external thread of the pin member has stab flanks, load flanks, roots, crests and a wedge ratio and increases in width in the other direction so that the complementary roots and crests of the respective internal and external threads move into engagement during make-up of the connection in conjunction with the moving of complementary stab and load flanks into engagement upon make-up of the connection. The wedge ratio of one step is an aggressive wedge ratio with a larger magnitude, while the wedge ratio of the other step is a conservative wedge ratio with a smaller magnitude.

In accordance with one or more embodiments of the invention, the number of threads on the step with the conservative wedge thread ratio may exceed the number of threads on the step with the aggressive wedge ratio. The two-step configuration may include a larger step and a smaller step and the aggressive wedge thread ratio may be on the larger step while the conservative wedge thread ratio may be on the smaller step.

The make-up sequence may start with the roots and crests of one or both steps making contact during the initial phase of make-up, followed by the stab and load flanks of the step with the conservative wedge ratio coming into contact as make-up continues and followed, upon final make-up, by the stab and load flanks of the step with the aggressive wedge ratio coming into contact.

The make-up sequence may start with the stab and load flanks of the step with the conservative wedge ratio coming into contact during the initial phase of make-up, followed by the roots and crests of one or both steps making contact as make-up continues and followed, upon final makeup, by the stab and load flanks of the step with the aggressive wedge ratio coming into contact.

The make-up sequence may start with the roots and crests of one or both steps and the stab and load flanks of the step with the conservative wedge ratio making contact simultaneously during make-up followed, upon final make-up, with the stab and load flanks of the step with the aggressive wedge ratio coming into contact. Upon final make-up the stab and load flanks may form sealing surfaces that resist the flow of fluids between the threads.

In general, in one aspect, the invention includes a box member having a plurality of tapered, internal, generally dovetail-shaped threads, each with stab flanks, load flanks, roots, crests and a wedge ratio and a pin member having a plurality of tapered, external, generally dovetail-shaped threads, each with stab flanks, load flanks, roots, crests and a wedge ratio. The internal threads of the box member increase in width in one direction while the external threads of the pin member increase in width in the other direction so that the complementary roots and crests of the internal and external threads move into engagement during make-up of the connection in conjunction with the moving of complementary stab and load flanks into engagement upon make-up of the connection. The wedge ratio of one thread is an aggressive wedge ratio with a larger magnitude while the wedge ratio of another thread is a conservative wedge ratio with a smaller magnitude.

In accordance with one or more embodiments of the invention, the number of threads on the thread with the conservative wedge thread ratio may exceed the number of threads on the thread with the aggressive wedge ratio. The box member may have two tapered, internal, generally dovetail-shaped threads formed in a two-start configuration and the pin member may have two tapered, external, generally dovetail-shaped threads formed in a two-start configuration. The two threads of the box member may be 180 degrees opposed and the two threads of the pin member may be 180 degrees opposed. The two threads of the box and pin members may include a first thread and a second thread. A tag line may be provided on an exterior surface of the pin and box member to distinguish the first and second threads.

The two threads of the box and pin members may include a first thread and a second thread having one half turn less than the first thread and starting in line with the first thread.

The make-up sequence may start with the roots and crests of one or both threads making contact during the initial phase of make-up, followed by the stab and load flanks of the thread with the conservative wedge ratio coming into contact as make-up continues and followed, upon final make-up, by the stab and load flanks of the thread step with the aggressive wedge ratio coming into contact.

The make-up sequence may start with the stab and load flanks of the thread with the conservative wedge ratio coming into contact during the initial phase of make-up, followed by the roots and crests of one or both threads making contact as make-up continues and followed, upon final make-up, by the stab and load flanks of the thread with the aggressive wedge ratio coming into contact.

The make-up sequence may start with the roots and crests of one or both threads and the stab and load flanks of the thread with the conservative wedge ratio making contact simultaneously during make-up and followed, upon final make-up, by the stab and load flanks of the thread with the aggressive wedge ratio coming into contact.

In general, in one aspect, the invention includes providing a box member having a tapered, internal, generally dovetail-shaped thread incorporated in a two-step configuration and providing a pin member having a tapered, external, generally dovetail-shaped thread incorporated in a two-step configuration. The internal thread of the box member has stab flanks, load flanks, roots, crests and a wedge ratio and increases in width in one direction. The external thread of the pin member has stab flanks, load flanks, roots, crests and a wedge ratio and increases in width in the other direction so that the complementary roots and crests of the respective internal and external threads move into engagement during make-up of the connection in conjunction with the moving of complementary stab and load flanks into engagement upon make-up of the connection. The invention also includes dimensioning the wedge ratio of one step to be an aggressive wedge ratio with a larger magnitude, dimensioning the wedge ratio of the other step to be a conservative wedge ratio with a smaller magnitude and rotationally engaging the pin and box members.

In accordance with one or more embodiments of the invention, the make-up sequence may start with the roots and crests of one or both steps making contact during the initial phase of make-up, followed by the stab and load flanks of the step with the conservative wedge ratio coming into contact as make-up continues and followed, upon final make-up, by the stab and load flanks of the step with the aggressive wedge ratio coming into contact.

The make-up sequence may start with the stab and load flanks of the step with the conservative wedge ratio coming into contact during the initial phase of make-up, followed by the roots and crests of one or both steps making contact as make-up continues and followed, upon final makeup, by the stab and load flanks of the step with the aggressive wedge ratio coming into contact.

The make-up sequence may start with the roots and crests of one or both steps and the stab and load flanks of the step with the conservative wedge ratio making contact simultaneously during make-up and followed, upon final makeup, by the stab and load flanks of the step with the aggressive wedge ratio coming into contact.

In general, in one aspect, the invention includes providing a box member having a plurality of tapered, internal, generally dovetail-shaped threads, each with stab flanks, load flanks, roots, crests and a wedge ratio and providing a pin member having a plurality of tapered, external, generally dovetail-shaped threads, each with stab flanks, load flanks, roots, crests and a wedge ratio. The internal wedge threads of the box member increase in width in one direction while the external threads of the pin member increase in width in the other direction so that the complementary roots and crests of the internal and external threads move into engagement during make-up of the connection in conjunction with the moving of complementary stab and load flanks into engagement upon make-up of the connection. The method also includes dimensioning the wedge ratio of one thread to be an aggressive wedge ratio with a larger magnitude, dimensioning the wedge ratio of another thread to be a conservative wedge ratio with a smaller magnitude and rotationally engaging the pin and box members.

In accordance with one or more embodiments of the invention, the make-up sequence may start with the roots and crests of one or both threads making contact during the initial phase of make-up, followed by the stab and load flanks of the thread with the conservative wedge ratio coming into contact as make-up continues and followed, upon final make-up, by the stab and load flanks of the thread with the aggressive wedge ratio coming into contact.

The make-up sequence may start with the stab and load flanks of the thread with the conservative wedge ratio coming into contact during the initial phase of make-up, followed by the roots and crests of one or both threads making contact as make-up continues and followed, upon final make-up, by the stab and load flanks of the thread with the aggressive wedge ratio coming into contact.

The make-up sequence may start with the roots and crests of one or both threads and the stab and load flanks of the thread with the conservative wedge ratio making contact simultaneously during make-up and followed upon, final make-up, by the stab and load flanks of the thread with the aggressive wedge ratio coming into contact.

Advantages may include one or more of the following. By increasing the wedge ratio on one thread, a better controlled and more positive torque stop is achieved. This allows for better control of the metal-to-metal seal location, resulting in seal geometry options that enhance sealability and galling resistance. The wedge ratio on the other thread is left conservative to allow for gradual yet adequate wedging as the torque stop is reached, thus maintaining back out torque resistance. Essentially, the elements of the wedge thread that provide an effective torque stop are optimized on one thread, while the elements of the wedge thread that provide resistance to break out torque are optimized on the other thread.

Friction problems also are resolved by these configurations. The farther the wedge thread has to travel while in contact, the larger the influence friction has during make-up and break out of the connection. As the time a wedge thread takes to get from initial flank contact to the final make-up position decreases, for both stab and load flanks, the effect of friction on make-up torque relative to the final make-up position lessens. Conversely, as the time a wedge thread takes to get from initial contact to final make-up position increases, for both stab and load flanks, the effect of friction on break out torque becomes larger.

The disclosed invention enhances performance of both sealability and galling resistance while maintaining back out torque resistance. Further, if fewer threads exist on the aggressive thread than on the conservative thread the effects of friction on make-up torque are minimized while the effects of friction on break out torque resistance are maximized. Other advantages and features will become apparent from the following description including the drawings and claims.

DETAILED DESCRIPTION

Referring to the drawings wherein like reference characters are used for like parts throughout the several views, FIGS. 4–10 illustrate a wedge-like thread connection or pipe joint in accordance with an embodiment of the invention.

Figure 4:
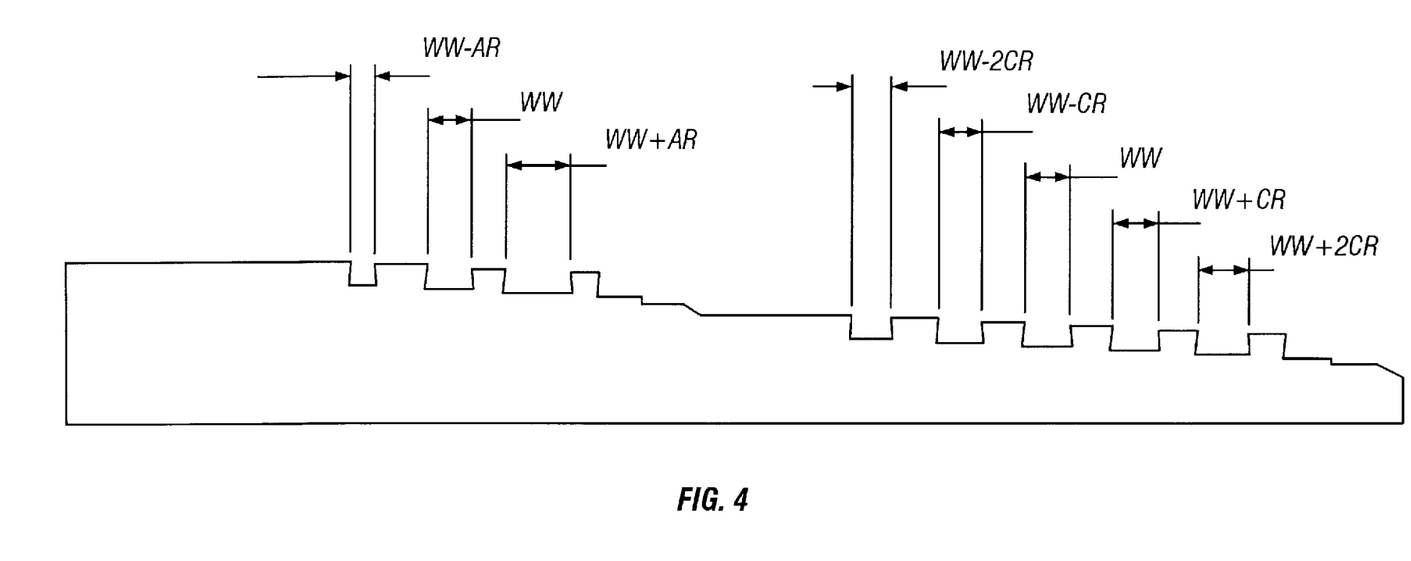
FIG. 4 is a side view of an embodiment of the invention.

Referring to FIG. 4, the basic wedge width is given by WW. A two-step thread design is shown that incorporates an aggressive wedge ratio (AR) on one step and a conservative wedge ratio (CR) on the other step. It will be understood by those in the art that while the configuration shown in FIG. 4 is a two-step thread design, this is merely exemplary and the invention may be implemented in other configurations, such as a two-start design.

The wedge ratio is the rate at which the wedge thread form closes upper revolution. The wedge ratio is a function of the stab and load flank leads. In the disclosed invention, the wedge ratio of the thread has a larger magnitude on one step than the wedge ratio of the thread on the other step. Those skilled in the art will appreciate that the embodiment shown in FIG. 4 is exemplary and the aggressive and conservative wedge ratios may be implemented on either step.

The thread with the larger wedge ratio is defined as having an aggressive wedge ratio and the thread with the smaller wedge ratio is defined as having a conservative wedge ratio. The thread with the aggressive wedge ratio acts as the torque stop during connector make-up, while the thread with the conservative wedge ratio resists connector break out torque. This configuration maximizes the effectiveness of the connection by separating the torque stopping responsibilities from the resistance to break out torque. The thread with the aggressive wedge ratio may have fewer threads than the thread with the conservative wedge ratio as shown. However, whether the number of threads is varied is a matter of design choice.

By changing the stab flank lead, the load flank lead, or both, between the two threads, a differential wedge thread is created. Further, by controlling the sequence of make-up of this differential wedge connection, the structural advantages can be maintained while enhancements to sealability are realized. The differential design also can increase resistance to break out torque.

The make-up sequence of the differential wedge threads can be controlled to produce various make-up sequences. In one configuration, the roots and crests of one or both threads come into contact initially during makeup. Then, as make-up continues, the stab and load flanks of the thread with the conservative wedge ratio come into contact. In a second configuration, the stab and load flanks of the thread with the conservative wedge ratio come into contact initially during make-up. Then, as make-up continues, the roots and crests of one or both of threads come into contact. In a third configuration, the roots and crests of one or both threads steps and the stab and load flanks of the thread with the aggressive wedge ratio come into contact upon final make-up. In this configuration, the metal-to-metal seal is properly energized and relatively uniform thread flank (both stab and load flanks) contact stresses on both threads are created.

Figure 5:
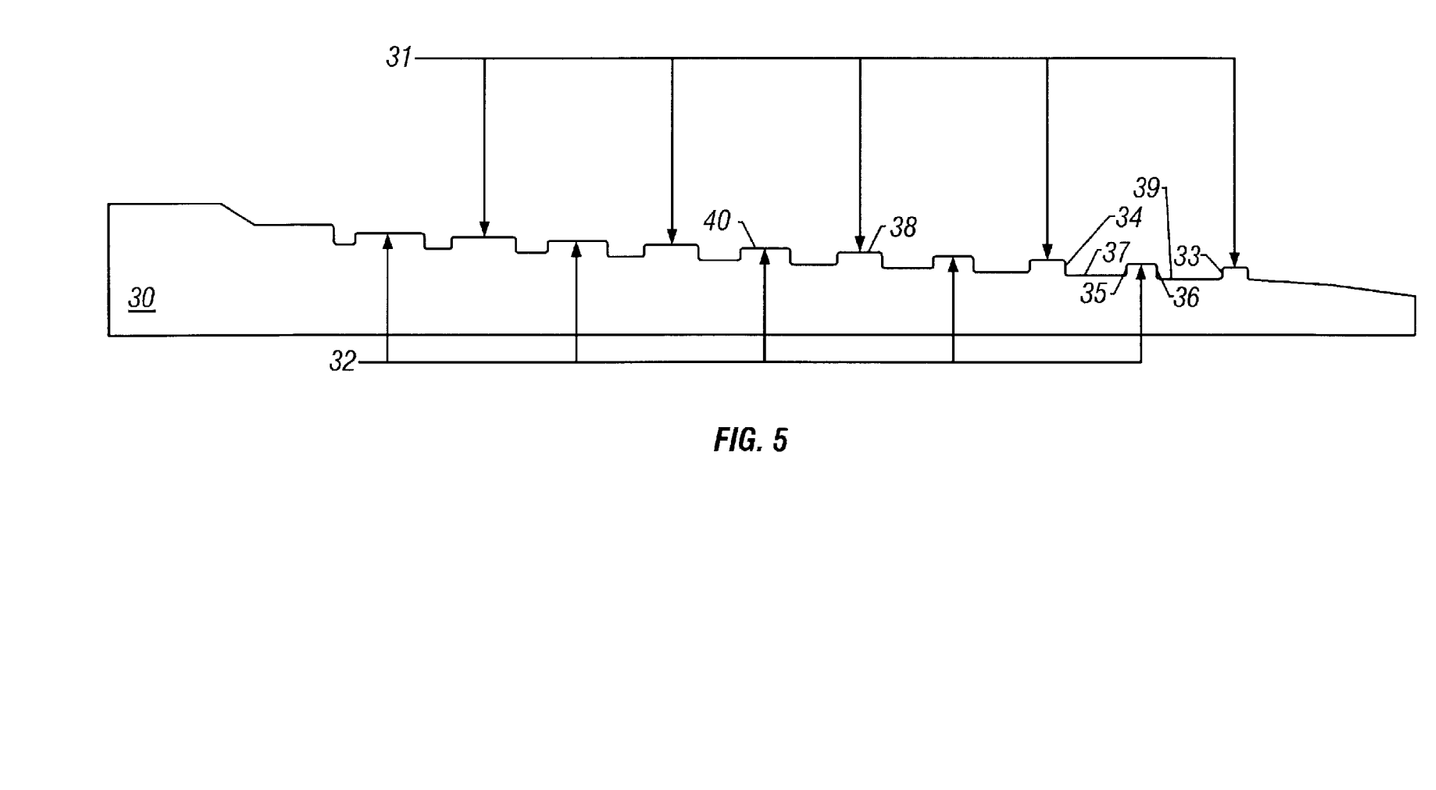
FIG. 5 is a side view of an embodiment of the invention showing the stab flank, load flank, and thread orientation of the two threads.
Figure 6:
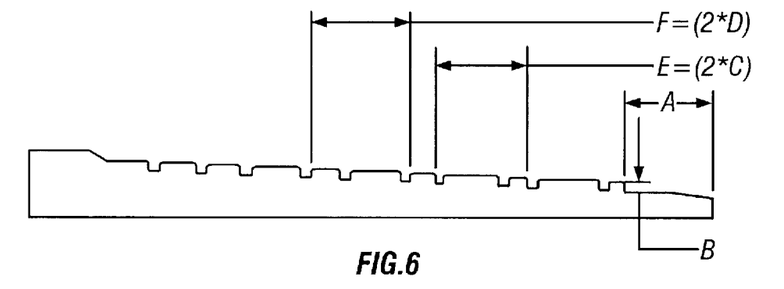
FIG. 6 is a side view of the thread structure in accordance with a developmental stage of an embodiment of the invention.

As earlier stated, any of these three configurations may be implemented in different thread designs, e.g., a two-step or a two-start design. Referring to FIG. 5, in one embodiment box member 30 has a first internal thread 31 and a second internal thread 32 formed, as described below, in a two-start orientation with, for example, first thread 31 being 180 degrees opposed to second thread 32. In another example, first thread 31 may be in line with second thread 32 and have one half turn less. First thread 31 has load flanks 33, stab flanks 34, roots 37, crests 38 and a wedge thread ratio. Second thread 32 has load flanks 35, stab flanks 36, roots 39, crests 40 and a wedge thread ratio. One thread incorporates an aggressive wedge thread ratio, while the other incorporates a conservative wedge thread ratio. Both threads 31 and 32 increase in width progressively at a uniform rate in one direction substantially their entire helical length. External threads of a pin member (not shown) are similarly formed in a two-start configuration as described below. The external threads of the pin member increase in width progressively at a uniform rate in the other direction substantially their entire helical length. The oppositely increasing thread widths and the taper of the external threads of the pin member cause the complementary roots and crests of the respective threads to move into engagement during make-up of the connection in conjunction with moving of complementary stab and load flanks into engagement upon make-up of the connection. Referring to FIG. 6, the wedge thread in accordance with an embodiment of the invention has a taper, stab flank lead E and load flank lead F twice that of the prior art taper, stab flank lead C and load flank lead D. In other words, E is equal to 2*C, F is equal 2*D and the taper of the invention is equal to twice the prior art taper. The doubling of the taper allows the thread to retain the original taper dimensions in a thread that can be made-up twice as fast, while the doubling the stab flank lead and load flank lead dimensions provides room on the connector for a second thread to be cut. The thread start location A and thread depth B retain the same value as prior art thread start location A and thread depth B.

Figure 7:
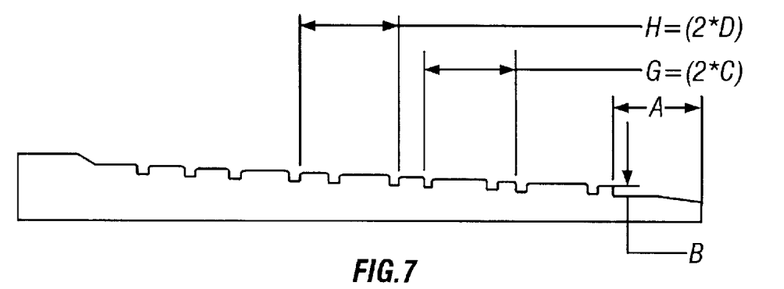
FIG. 7 is a side view of the thread structure in accordance with a developmental stage of an embodiment of the invention.
Figure 8:
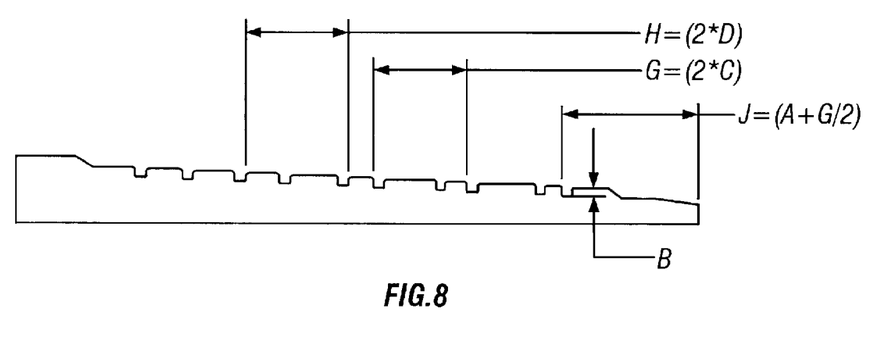
FIG. 8 is a side view of the thread structure in accordance with a developmental stage of an embodiment of the invention.

In FIG. 7, a similar wedge thread configuration is depicted 180 degrees out of phase of FIG. 6. This similar wedge thread also has a taper, stab flank G and load flank H twice that of the prior art taper, stab flank C and load flank D. Again, this means that G is equal to 2*C, H is equal 2*D and the taper of the invention is equal to twice the prior art taper. The thread start location A and thread depth B are also maintained in this thread. These similar wedge threads each represent a thread of the final two-start configuration. Referring to FIG. 8, the two threads can be placed in line by orienting the thread of FIG. 7 into the same plane as the thread of FIG. 6. This results in a thread start location J which is half of the stab flank lead G further along the member. In other words, J is equal to A +(G/2).

Figure 9:
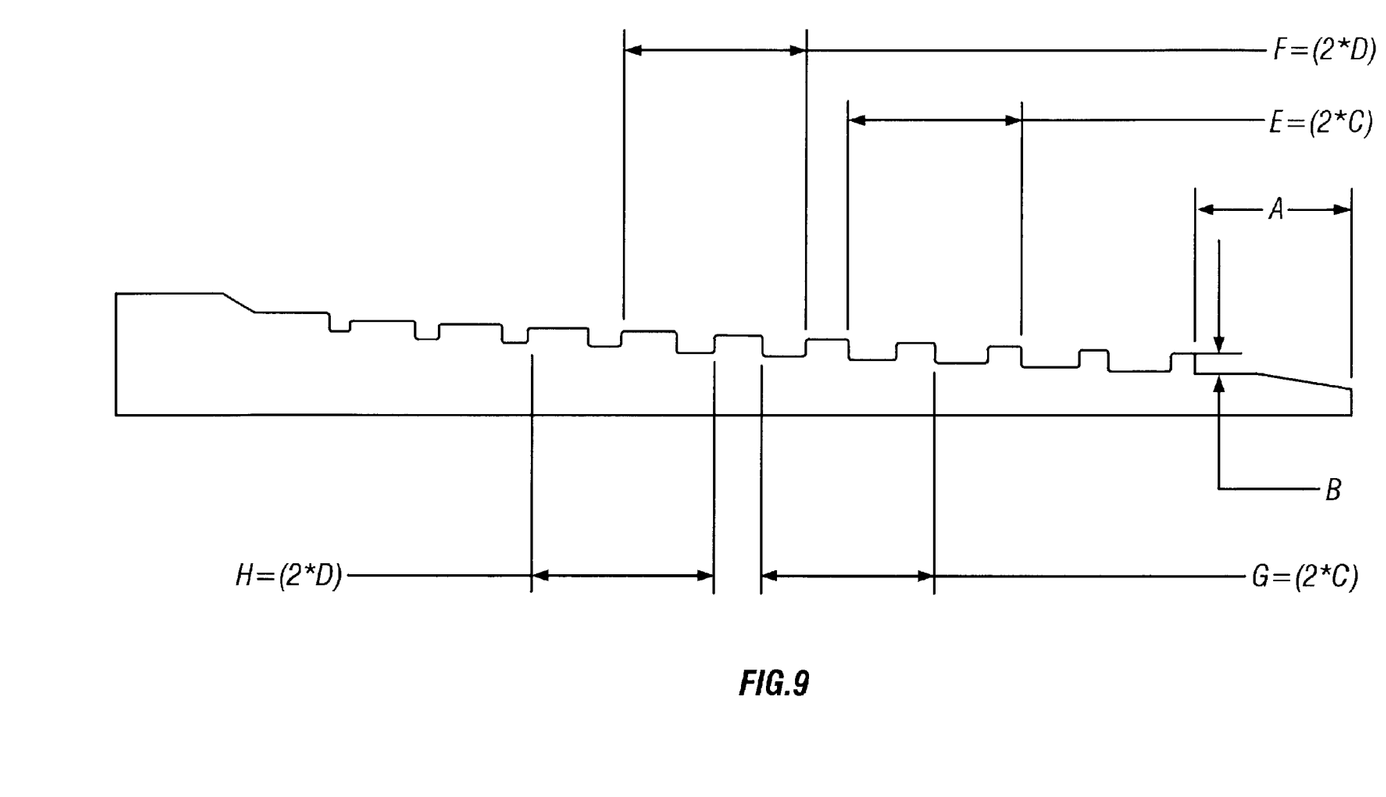
FIG. 9 is a side view of the embodiment of the invention showing he thread start, thread depth, stab flank lead, and load flank lead relationships.

Referring to FIG. 9, if FIG. 6 is overlaid onto FIG. 8 and the excess material at the thread roots is removed, a two-start wedge thread is created in accordance with an embodiment of the invention. The taper, stab flank lead E, G and load flank lead F, H are twice that of the prior art taper, stab flank lead C and load flank lead D. The thread start location A and thread depth B remain unchanged. It can be seen, by comparing FIG. 9 to FIG. 2, that the thread leads E, F, G and H will advance twice as fast per revolution during make-up as the thread leads C and D. This rapid advancement reduces the duration and amount of metal-to-metal contact between the threads during make-up. An aggressive wedge ratio may be incorporated on one thread while a conservative wedge ratio may be incorporated the other.

In this configuration, a reference, or tag, line may used to distinguish the thread with the aggressive wedge ratio from the thread with the conservative wedge ratio for proper alignment at initial stabbing of the pin member into the box member and prior to make-up. This reference line may be provided for either or both of the threads on an exterior surface of the pin and box members.

Alternatively, a thread could be added to the configuration shown in FIG. 6 in line with and set one half turn back from the existing thread. This would provide a two-start wedge thread configuration with both threads starting at the same point on the connector. In this configuration, a reference line may be provided on the pin member to show a proper initial stab depth. This reference line may be provided on the last turn of the external thread showing when the pin member is initially inserted into the box member and prior to make-up. Another method of distinguishing the threads would be providing the reference line in a location a known fixed distance from the box member when the pin member is initially inserted and prior to make-up. This solution requires a measurement to be taken at initial stabbing of the pin into box member and prior to make-up. Those skilled in the art will understand that other alternatives exist to ensure proper make-up.

Figure 10:
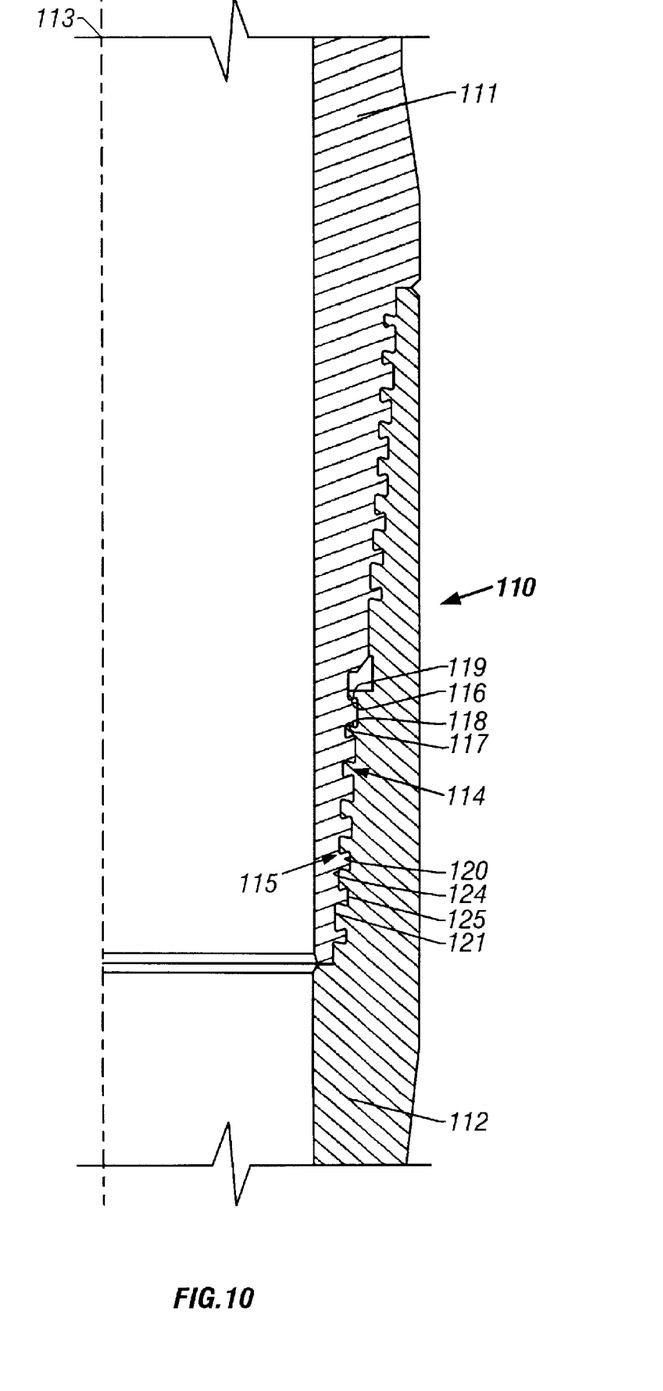
FIG. 10 is a side view of a made-up pin member external thread structure and a box member internal thread structure in accordance with an embodiment of the invention.

Referring to FIG. 10, in one embodiment internal thread 114 of box member 112 is formed in a two-step wedge configuration providing two wedge thread steps each having stab flanks 118, load flanks 116, roots 120, crests 124 and a wedge ratio. One thread step incorporates an aggressive wedge ratio, while the other thread step incorporates a conservative wedge ratio. The thread increases in width progressively at a uniform rate in one direction substantially the entire helical length of thread 114. External thread 115 of pin member 111 is formed with in a two-step wedge configuration providing two wedge thread steps each having stab flanks 119, load flanks 117, roots 121, crests 125 and a wedge ratio. One thread step incorporates an aggressive wedge ratio, while the other thread step incorporates a conservative wedge ratio. The thread increases in width progressively at a uniform rate in the other direction substantially the entire helical length of thread 115. The oppositely increasing thread widths and the taper of the threads 114 and 115 cause the complementary roots and crests of the respective threads to move into engagement during make-up of the connection in conjunction with moving of complementary stab and load flanks into engagement upon make-up of the connection. The steps incorporating the aggressive wedge ratio are complementary, i.e., the step having aggressive wedge ratio on the pin member moves into engagement with the step having the aggressive wedge ratio on the box member. Similarly, the step having the conservative wedge ratio on the pin member moves into engagement with the step having the conservative wedge ratio on the box member.

As used herein, and as conventionally understood where tubular joints are being connected in a vertical position such as when making up a pipe string for lowering into a well bore, the term "load flank" designates the side wall surface of a thread that faces away from the outer end of the respective pin or box member on which the thread is formed. The term "stab flank" designates that side wall surface of the thread that faces toward the outer end of the respective pin or box member and supports the weight of the upper tubular member during the initial make-up of the joint.

It will be understood that certain features and subcombinations are of utility and may be employed without reference to other features and subcombinations. This is contemplated by and is within the scope of the claims.

The disclosed design has many distinct advantages. Both the sealability and galling resistance of the connection are enhanced while maintaining the break out torque resistance. By using an aggressive wedge ratio on one thread, the disclosed invention offers the advantage of achieving a better controlled and more positive torque stop. At the same time, by using a conservative wedge ratio on the other thread, the disclosed invention offers the advantage of maximizing the effects of friction on break out torque resistance. Further, if fewer threads exist on the aggressive thread than on the conservative thread the effects of friction on make-up torque are minimized, while the effects of friction on break out torque resistance are maximized.

Because many possible embodiments may be made of the invention without departing from the scope thereof, it is to be understood that all matter herein set forth or shown in the accompanying drawings is to be interpreted as illustrative and not in a limiting sense.

While the present invention has been described with respect to a limited number of preferred embodiments, those skilled in the art will appreciate numerous modifications and variations therefrom. The appended claims are intended to cover all such modifications and variations which occur to one of ordinary skill in the art.

What is claimed is:

1. A threaded pipe connection comprising:
    a box member comprising a tapered, internal, generally dovetail-shaped thread incorporated in a two-step configuration, the internal thread having stab flanks, load flanks, roots, crests and a wedge ratio and increasing in width in one direction;
    a pin member comprising a tapered, external, generally dovetail-shaped thread incorporated in a two-step configuration, the external thread having stab flanks, load flanks, roots, crests and a wedge ratio increasing in width in the other direction so that the complementary roots and crests of the respective internal and external threads move into engagement during make-up of the connection in conjunction with the moving of complementary stab and load flanks into engagement upon make-up of the connection;
    wherein the wedge ratio of one step is an aggressive wedge ratio with a larger magnitude; and
    the wedge ratio of the other step is a conservative wedge ratio with a smaller magnitude.

2. The connection of claim 1, wherein the number of threads on the step with the conservative wedge thread ratio exceeds the number of threads on the step with the aggressive wedge ratio.

3. The connection of claim 1, wherein the two-step configuration on each the pin and box member comprises a larger step and a smaller step;
    the aggressive wedge thread ratio is on the larger step; and
    the conservative wedge thread ratio is on the smaller step.

4. The connection of claim 1, wherein the make-up sequence starts with the roots and crests of at least one of the steps making contact during the initial phase of make-up;
    followed by the stab and load flanks of the step with the conservative wedge ratio coming into contact as make-up continues; and
    followed, upon final make-up, by the stab and load flanks of the step with the aggressive wedge ratio coming into contact.

5. The connection of claim 1, wherein the make-up sequence starts with the stab and load flanks of the step with the conservative wedge ratio coming into contact during the initial phase of make-up;
    followed by the roots and crests of at least one of the steps making contact as make-up continues; and
    followed, upon final make-up, by the stab and load flanks of the step with the aggressive wedge ratio coming into contact.

6. The connection of claim 1, wherein the make-up sequence starts with the roots and crests of at least one of the steps and the stab and load flanks of the step with the conservative wedge ratio making contact simultaneously during make-up; and
    followed, upon final make-up, with the stab and load flanks of the step with the aggressive wedge ratio coming into contact.

7. The connection of claim 1, wherein upon final make-up the stab and load flanks form sealing surfaces that resist the flow of fluids between the threads.

8. A threaded pipe connection comprising:
    a box member comprising a plurality of tapered, internal, generally dovetail-shaped threads, each with stab flanks, load flanks, roots, crests and a wedge ratio, the internal threads increasing in width in one direction;
    a pin member comprising a plurality of tapered, external, generally dovetail-shaped threads, each with stab flanks, load flanks, roots, crests and a wedge ratio, the external threads increasing in width in the other direction so that the complementary roots and crests of the internal and external threads move into engagement during make-up of the connection in conjunction with the moving of complementary stab and load flanks into engagement upon make-up of the connection;
    wherein the wedge ratio of one thread is an aggressive wedge ratio with a larger magnitude; and
    the wedge ratio of another thread is a conservative wedge ratio with a smaller magnitude.

9. The connection of claim 8, wherein the number of threads on the thread with the conservative wedge thread ratio exceeds the number of threads on the thread with the aggressive wedge ratio.

10. The connection of claim 8, wherein the box member has two tapered, internal, generally dovetail-shaped threads formed in a two-start configuration and the pin member has two tapered, external, generally dovetail-shaped threads formed in a two-start configuration.

11. The connection of claim 10, wherein the two threads of the box member are 180 degrees opposed and the two threads of the pin member are 180 degrees opposed.

12. The connection of claim 11, wherein the two threads of the box and pin members each comprise a first thread and a second thread, the connection further comprising:
    a tag line provided on an exterior surface of the pin and box member to distinguish the first and second threads.

13. The connection of claim 10, wherein the two threads of the pin and box members each comprise:
    a first thread; and
    a second thread having one half turn less than the first thread and starting in line with the first thread.

14. The connection of claim 8, wherein the make-up sequence starts with the roots and crests of at least one of the threads making contact during the initial phase of make-up;
    followed by the stab and load flanks of the thread with the conservative wedge ratio coming into contact as make-up continues; and
    followed, upon final make-up, by the stab and load flanks of the thread with the aggressive wedge ratio coming into contact.

15. The connection of claim 8, wherein the make-up sequence starts with the stab and load flanks of the thread with the conservative wedge ratio coming into contact during the initial phase of make-up;
    followed by the roots and crests of at least one of the threads making contact as make-up continues; and
    followed, upon final make-up, by the stab and load flanks of the thread with the aggressive wedge ratio coming into contact.

16. The connection of claim 8, wherein the make-up sequence starts with the roots and crests of at least one of the threads and the stab and load flanks of the thread with the conservative wedge ratio making contact simultaneously during make-up; and followed, upon final make-up, by the stab and load flanks of the thread with the aggressive wedge ratio coming into contact.

17. A method of making up a threaded pipe connection, the method comprising:

providing a box member comprising a tapered, internal, generally dovetail-shaped thread incorporated in a two-step configuration, the internal thread having stab flanks, load flanks, roots, crests and a wedge ratio and increasing in width in one direction;

providing a pin member comprising a tapered, external, generally dovetail-shaped thread incorporated in a two-step configuration, the external thread having stab flanks, load flanks, roots, crests and a wedge ratio and increasing in width in the other direction so that the complementary roots and crests of the respective internal and external threads move into engagement during make-up of the connection in conjunction with the moving of complementary stab and load flanks into engagement upon make-up of the connection;

dimensioning the wedge ratio of one step to be an aggressive wedge ratio with a larger magnitude;

dimensioning the wedge ratio of the other step to be a conservative wedge ratio with a smaller magnitude; and rotationally engaging the pin and box members.

18. The method of claim 18, wherein the make-up sequence starts with the roots and crests of at least one of the steps making contact during the initial phase of make-up;

followed by the stab and load flanks of the step with the conservative wedge ratio coming into contact as make-up continues; and followed, upon final make-up, by the stab and load flanks of the step with the aggressive wedge ratio coming into contact.

19. The method of claim 18, wherein the make-up sequence starts with the stab and load flanks of the step with the conservative wedge ratio coming into contact during the initial phase of make-up;

followed by the roots and crests of at least one of the steps making contact as make-up continues; and followed, upon final make-up, by the stab and load flanks of the step with the aggressive wedge ratio coming into contact.

20. The method of claim 18, wherein the make-up sequence starts with the roots and crests of at least one of the steps and the stab and load flanks of the step with the conservative wedge ratio making contact simultaneously during make-up; and followed, upon final make-up, by the stab and load flanks of the step with the aggressive wedge ratio coming into contact.

21. A method of making up a threaded pipe connection, the method comprising:

providing a box member comprising a plurality of tapered, internal, generally dovetail-shaped threads, each with stab flanks, load flanks, roots, crests and a wedge ratio, the internal wedge threads increasing in width in one direction;

providing a pin member comprising a plurality of tapered, external, generally dovetail-shaped threads, each with stab flanks, load flanks, roots, crests and a wedge ratio, the external wedge threads increasing in width in the other direction so that the complementary roots and crests of the internal and external threads move into engagement during make-up of the connection in conjunction with the moving of complementary stab and load flanks into engagement upon make-up of the connection;

dimensioning the wedge ratio of one thread to be an aggressive wedge ratio with a larger magnitude;

dimensioning the wedge ratio of another thread to be a conservative wedge ratio with a smaller magnitude; and rotationally engaging the pin and box members.

22. The method of claim 22 further comprising:

providing a number of thread on the threads with the conservative wedge thread ratio that exceeds the number of threads on the thread with the aggressive wedge ratio.

23. The method of claim 22, wherein the make-up sequence starts with the roots and crests of at least one of the threads making contact during the initial phase of make-up;

followed by the stab and load flanks of the thread with the conservative wedge ratio coming into contact as make-up continues; and followed, upon final make-up, by the stab and load flanks of the thread with the aggressive wedge ratio coming into contact.

24. The method of claim 22, wherein the make-up sequence starts with the stab and load flanks of the thread with the conservative wedge ratio coming into contact during the initial phase of make-up;

followed by the roots and crests of at least one of the threads making contact as make-up continues; and followed, upon final make-up, by the stab and load flanks of the thread with the aggressive wedge ratio coming into contact.

25. The connection of claim 22, wherein the make-up sequence starts with the roots and crests of at least one of the threads and the stab and load flanks of the thread with the conservative wedge ratio making contact simultaneously during make-up; and followed upon, final make-up, by the stab and load flanks of the thread with the aggressive wedge ratio coming into contact.

* * * * *

UNITED STATES PATENT AND TRADEMARK OFFICE
CERTIFICATE OF CORRECTION

PATENT NO. : 6,206,436 B1  
DATED : March 27, 2001  
INVENTOR(S) : David Mallis

It is certified that error appears in the above-identified patent and that said Letters Patent is hereby corrected as shown below:

<u>Title page,</u>  
Item [56], U.S. PATENT DOCUMENTS,

| | | | |
|---|---|---|---|
| -- RE 34,467 | 12/1993 | Reeves | 285/334 |
| RE 30,647 | 06/1981 | Blose | 285/332.2 |
| 2,177,100 | 10/1939 | Frame | 285/146 |
| 4,671,544 | 06/1987 | Ortloff | 285/334 |
| 4,676,529 | 06/1987 | McDonald | 285/92 |
| 4,703,954 | 11/1987 | Ortloff et al. | 285/115 |
| 4,703,959 | 11/1987 | Reeves et al. | 285/332.3 |
| 4,708,038 | 11/1987 | Hellnick et al. | 82/1C |
| 4,712,815 | 12/1987 | Reeves | 285/334 |
| 4,943,094 | 07/1990 | Simmons | 285/333 |
| 5,127,784 | 07/1992 | Eslinger | 411/414 |
| 5,338,074 | 08/1994 | Barringer et al. | 285.334 |
| 5,360,240 | 11/1994 | Mott | 285/95 |
| 5,454,605 | 10/1995 | Mott | 285/333 |

FOREIGN PATENT DOCUMENTS  
3805512A1  9/1988  Germany  
2148439A1  5/1985  Great Britain OTHER  
PCT International Search Report 09/1998 --

Signed and Sealed this

Twenty-sixth Day of March, 2002

*Attest:*

*Attesting Officer*

JAMES E. ROGAN  
*Director of the United States Patent and Trademark Office*